United States Patent
Oishi

(10) Patent No.: US 8,587,433 B2
(45) Date of Patent: Nov. 19, 2013

(54) PRODUCT ADMINISTRATION SYSTEM

(75) Inventor: Sadatoshi Oishi, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 564 days.

(21) Appl. No.: 12/874,110

(22) Filed: Sep. 1, 2010

(65) Prior Publication Data

US 2011/0063112 A1 Mar. 17, 2011

(30) Foreign Application Priority Data

Sep. 17, 2009 (JP) ................................. 2009-215943

(51) Int. Cl.
*G08B 13/14* (2006.01)
*G08B 1/08* (2006.01)
*G08B 26/00* (2006.01)
*G01P 15/00* (2006.01)

(52) U.S. Cl.
USPC .................... 340/572.1; 340/568.1; 340/10.1; 340/539.22; 340/505; 73/514.1; 73/510

(58) Field of Classification Search
USPC ........................................................ 340/572.1
See application file for complete search history.

(56) References Cited

U.S. PATENT DOCUMENTS

| | | | |
|---|---|---|---|
| 7,897,887 B2 * | 3/2011 | Blank .................... | 200/61.45 R |
| 2003/0122655 A1 * | 7/2003 | Hum et al. ................... | 340/10.3 |
| 2005/0164633 A1 * | 7/2005 | Linjama et al. .............. | 455/41.2 |
| 2006/0230108 A1 * | 10/2006 | Tatsuta et al. ................. | 709/204 |
| 2008/0000295 A1 * | 1/2008 | Kitazaki et al. ................ | 73/510 |

FOREIGN PATENT DOCUMENTS

| | | |
|---|---|---|
| JP | 2004-78632 A | 3/2004 |
| JP | 2006-195502 A | 7/2006 |
| JP | 2007-122563 | 5/2007 |

OTHER PUBLICATIONS

Japanese Office Action dated Oct. 25, 2011, filed in Japanese counterpart Application No. 2009-215943, 5 pages (with English translation).

Iwai, M. et al., "Analyzing System of Costumers' Attention using Tiny Sensor Nodes", IPSJ SIG Technical Report, vol. 2008, No. 18, Mar. 6, 2008, pp. 173-177.

* cited by examiner

*Primary Examiner* — Jennifer Mehmood
*Assistant Examiner* — Fekadeselassie Girma
(74) *Attorney, Agent, or Firm* — Patterson & Sheridan, LLP

(57) ABSTRACT

According to the product administration system of the present embodiment, the radio tag having the acceleration sensor and the inquiry unit for communication with the radio tag are provided, the inquiry unit sets a direction of acceleration and a threshold value of the acceleration in the direction in the radio tag by communication, and the set radio tag responds to an inquiry from the inquiry unit when it exceeds the threshold value.

9 Claims, 7 Drawing Sheets

|   | 1 | 2 | 3 | 4 |
|---|---|---|---|---|
|   | Acceleration Sensor | | | |
| x | 0G ( 0 ) | 0G ( 0 ) | 0G ( 0 ) | 0G ( 0 ) |
| y | 0G ( 0 ) | 1G ( 100 ) | 0G ( 0 ) | -1G ( -100 ) |
| z | -1G ( -100 ) | 0G ( 0 ) | 1G ( 100 ) | 0G ( 0 ) |

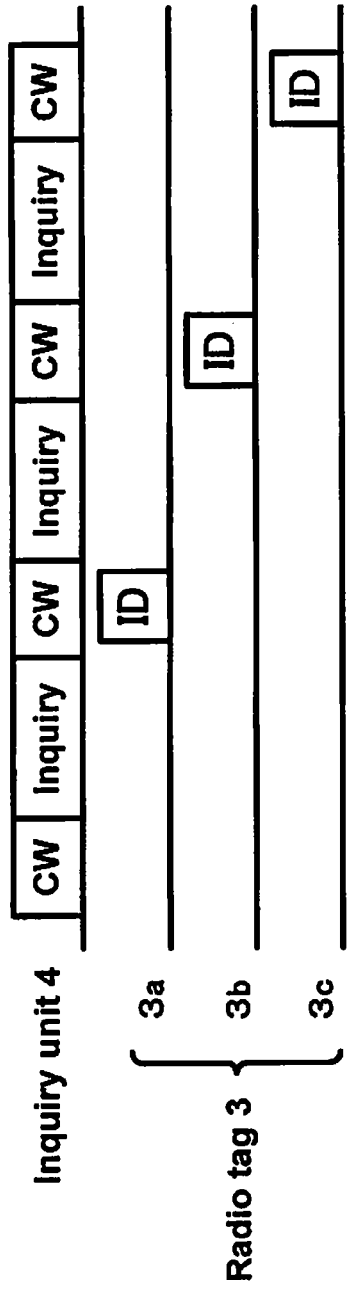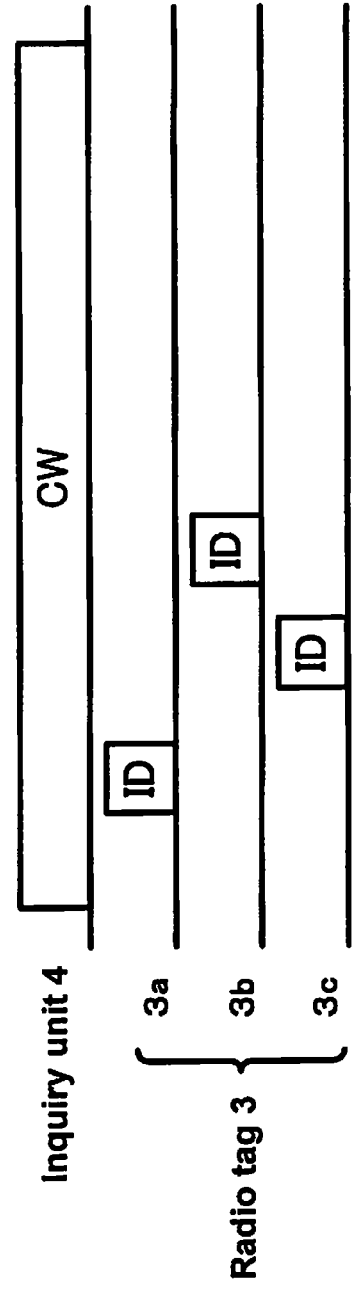

PRODUCT ADMINISTRATION SYSTEM

CROSS-REFERENCE TO RELATED APPLICATION

This application is based upon and claims the benefit of priority from Japanese Patent Application No. 2009-215943, filed on Sep. 17, 2009, the entire contents of which are incorporated herein by reference.

FIELD

Embodiments described herein relate generally to a product payment device used in retail stores or the like and particularly to a product payment device of using an RFID (Radio frequency Identification) tag.

BACKGROUND

In apparel stores, there is a need to know products customers are interested in from information of the products picked up by the customers, for example, clothes. Then, there is known a method of attaching a radio tag having an sensor such as a vibration sensor to a product and reading information of the radio tag thereby to monitor the state of the product.

For example, the Japanese Patent Application Laid-Open No. 2004-78632 discloses a customer trend survey system having monitoring means for monitoring whether a product is moved by a customer or not by a radio tag having a vibration sensor and a counting means for counting the number of times of moving the product. Besides, the Japanese Patent Application Laid-Open No. 2006-195502 discloses of a battery-cell-less passive tag having a sensor. With this, it is possible to collect information of how much customers are interested in the unsold products.

However, in the above-mentioned system, for example, if a target cloth hanged by the hanger is picked up, adjacent products are moved to be set aside. Then, the sensor of the radio tag of the product set aside responds inevitably and it becomes difficult to know the products held by the customers only.

In addition, as such measurement is performed also when the salesclerk is in touch with a product for arrangement, and therefore, it becomes difficult to know the number of times of the customer picking up of the product.

BRIEF DESCRIPTION OF THE DRAWINGS

The accompanying drawings, which is incorporated in and constitute a part of this specification, illustrates an embodiment of the invention and together with the description, serve to explain the principles of the invention.

FIG. 10 schematically illustrates a communication system of the radio tag of the of the product administration system; and FIG. 11 schematically illustrates another communication system of the radio tag of the of the product administration system.

DETAILED DESCRIPTION

Figure 1:
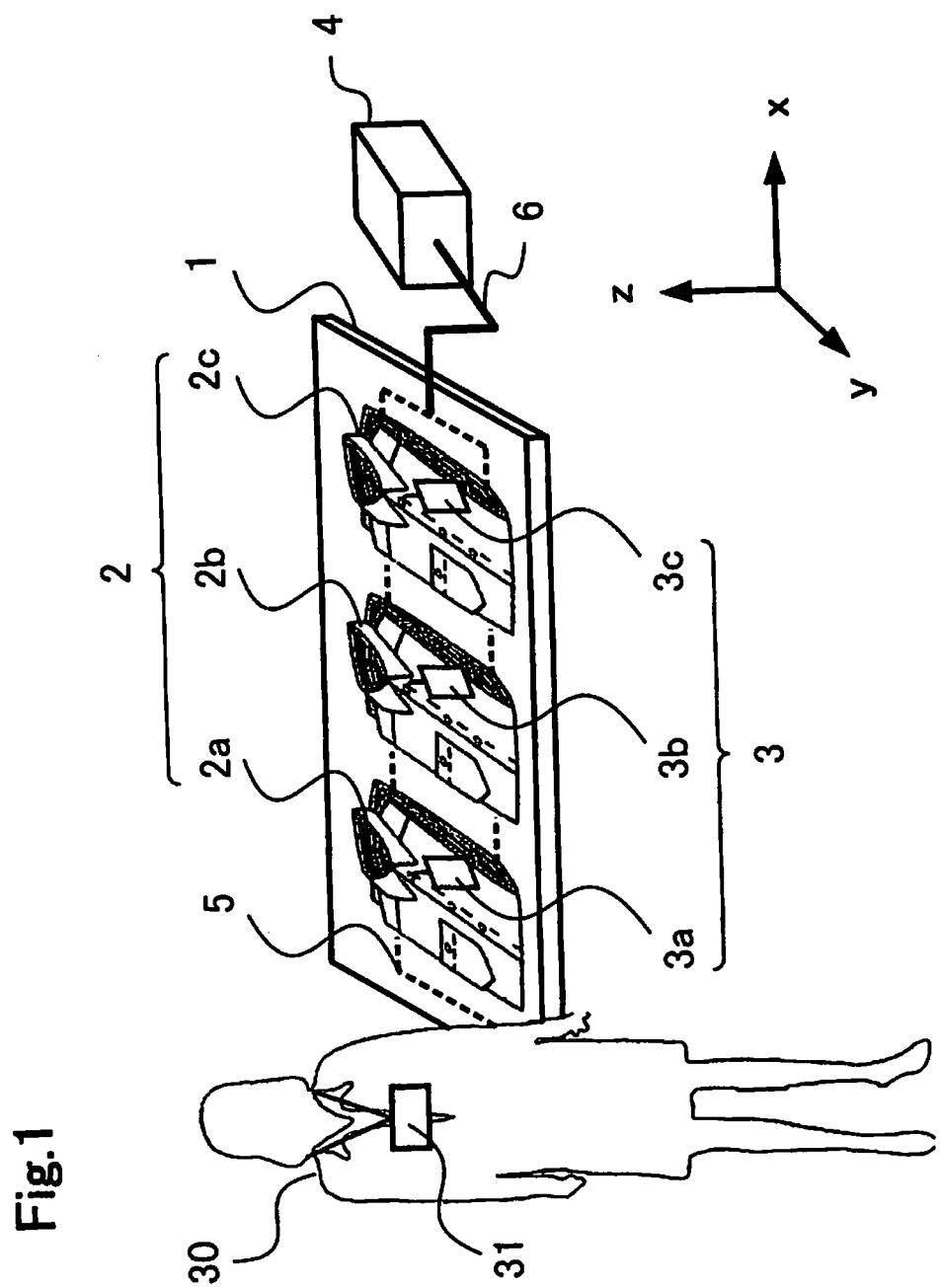
FIG. 1 is a structural view of a product administration system according to an embodiment that is applied to a product shelf.

Reference will now be made in detail to the present embodiment, an example of which is illustrated in the accompanying drawing.

According to the product administration system of the present embodiment, the radio tag having the acceleration sensor and the inquiry unit for communication with the radio tag are provided, the inquiry unit sets a direction of acceleration and a threshold value of the acceleration in the direction in the radio tag by communication, and the set radio tag responds to an inquiry from the inquiry unit when it exceeds the threshold value.

Further, according to another aspect of the product administration system, the radio tag having the acceleration sensor and the inquiry unit for communication with the radio tag are provided, the inquiry unit sets a direction of acceleration and a threshold value of the acceleration in the direction to the radio tag by communication, and the set radio tag voluntarily sends information to the inquiry unit when it exceeds the threshold value.

Furthermore, according to another aspect of the product administration system, the first radio tag having an acceleration sensor, the second radio tag that a salesclerk holds with him/her, and the inquiry unit for communication with the first and second radio tags and placed at a position where it is communicable with the first radio tag are provided. The inquiry unit sets a direction of acceleration and a threshold value of the acceleration in the direction in the first radio tag by communication, and the set first radio tag responds to an inquiry from the inquiry unit when it exceeds the threshold value. While the above-mentioned inquiry unit detects the ID of the second radio tag, it does not make inquiry to the first radio tag, stops the product administration processing or discards the ID to which the first radio tag belong Hereinafter, the present embodiment will be described with reference to the drawings. Here, in the following description, if the same reference numerals are used, this means such same reference numerals denote the same structure or functions.

First, the structure of a product administration system according to the present embodiment will be described with reference to FIGS. 1 to 7.

FIG. 1 is a structural view of a product administration system according to the present embodiment. This product administration system has a product shelf 1, a radio tag 3 attached to a product 2 displayed in the product shelf 1 and an inquiry unit 4 for performing communication with the radio tag 3. An antenna 5 is provided at the product shelf 1 and connected to the inquiry unit 4 via a coaxial cable 6. The antenna 5 may be installed at a place where it is communicable with the radio tag 3 and may not be placed on the product shelf 1. The salesclerk 30 has an ID card 31 having the radio tag with him/her and goes round in the store appropriately. Here, in order to simplify the description, the numbers of products 2 and radio tags 3 are set to 3 and the number of product shelves is set to 1. However, these are not intended for limiting the invention.

Figure 2:
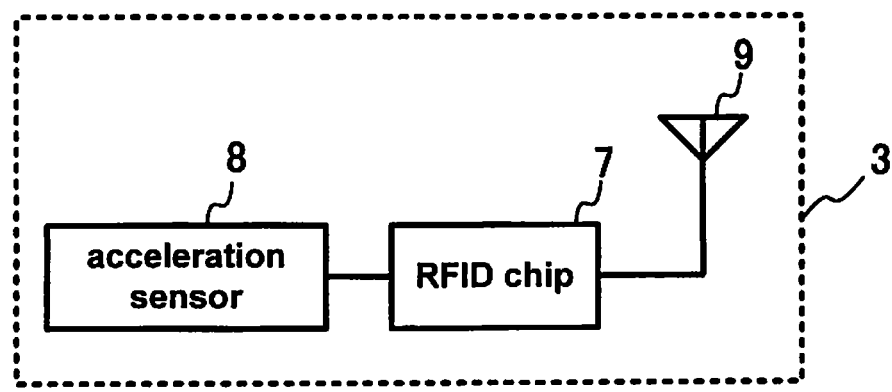
FIG. 2 is a simplified structural block diagram of a radio tag.
Figure 3:
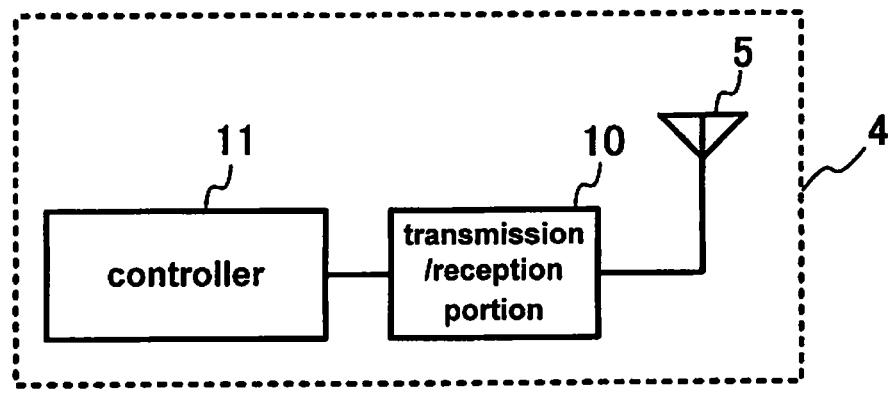
FIG. 3 is a simplified structural block diagram of an inquiry unit.

FIGS. 2 and 3 illustrate simplified structure of the inquiry unit 4 and the radio tag 3 of the product administration system of the present embodiment. The radio tag 3 has an RFID chip 7, an acceleration sensor 8 and an antenna 9. The acceleration sensor 8 and the antenna 9 are connected to the RFID chip 7. The inquiry unit 4 has a transmission/reception portion 10, a controller 11 and antenna 5, the antenna 5 and the controller 11 are connected to the transmission/reception portion 10. A high-frequency signal output from the transmission/reception portion 10 is emitted from the antenna 5. In addition, a signal responded by the radio tag 3 is received by the antenna 5 and demodulated by the transmission/reception portion 10. The controller 11 has a CPU and a memory and is configured to control the transmission/reception portion 10 and perform product administration.

Figure 4:
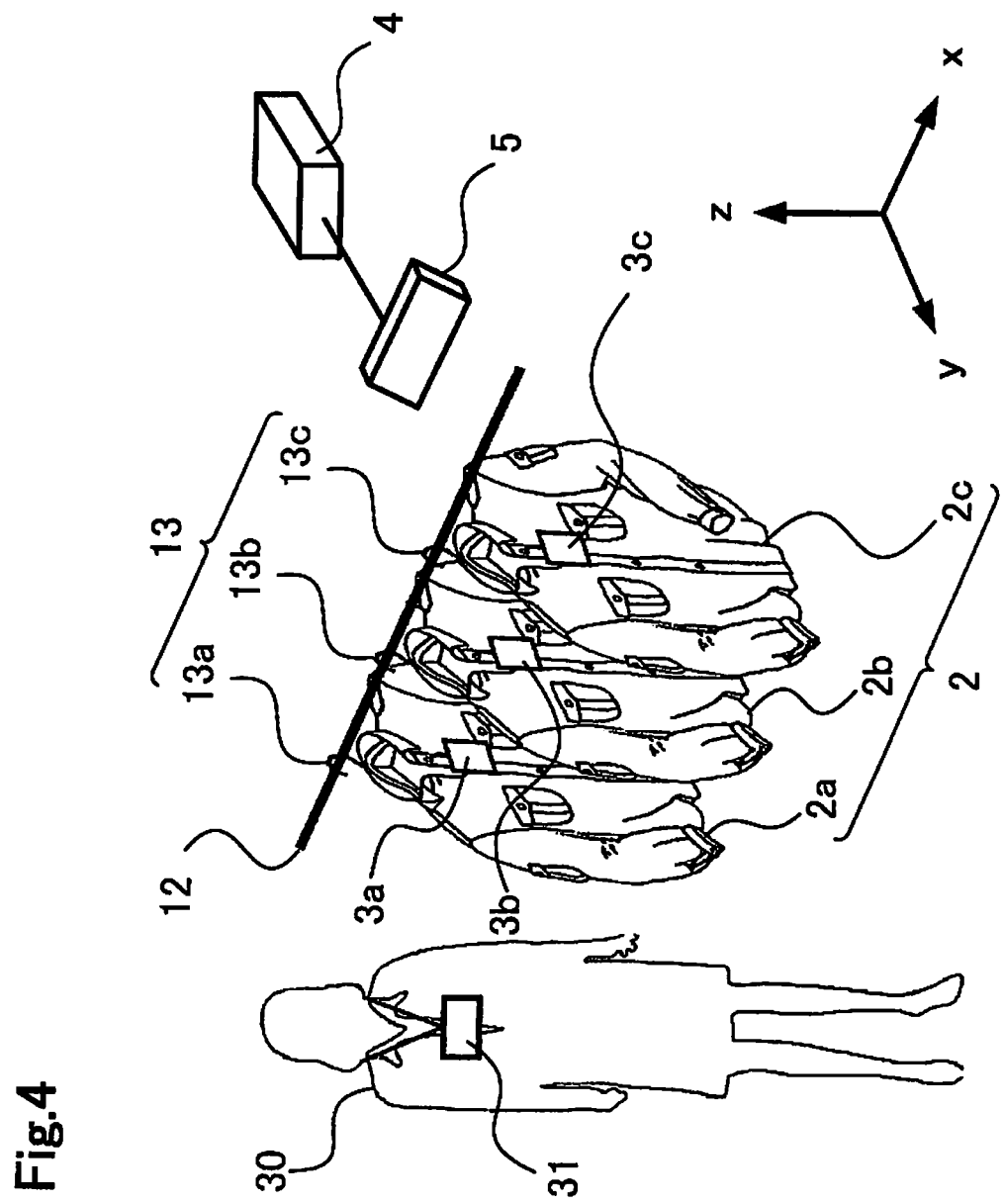
FIG. 4 is a structural view of the product administration system according to the present embodiment that is applied to a hanger rack.

FIG. 4 is a structural view of the product administration system of the present embodiment that is applied to the hanger rack. In this product administration system, a hanger rack 12, a hanger 13, the radio tag 3 attached to the product 2 and the inquiry unit 4. The product 2 is hanged on the hanger rack 12 by the hanger 13. The antenna 5 is placed such that it is communicable with the radio tag 3 and is connected to the inquiry unit 4. The antenna 5 may be built in the hanger rack 12. The salesclerk 30 has the ID card 31 having the radio tag with him/her and goes round in the store. Here, for the same reason as that in FIG. 1, the numbers of products 2 and radio tags 3 are set to 3 and the number of hanger racks is set to 1.

Figures 5, 6:
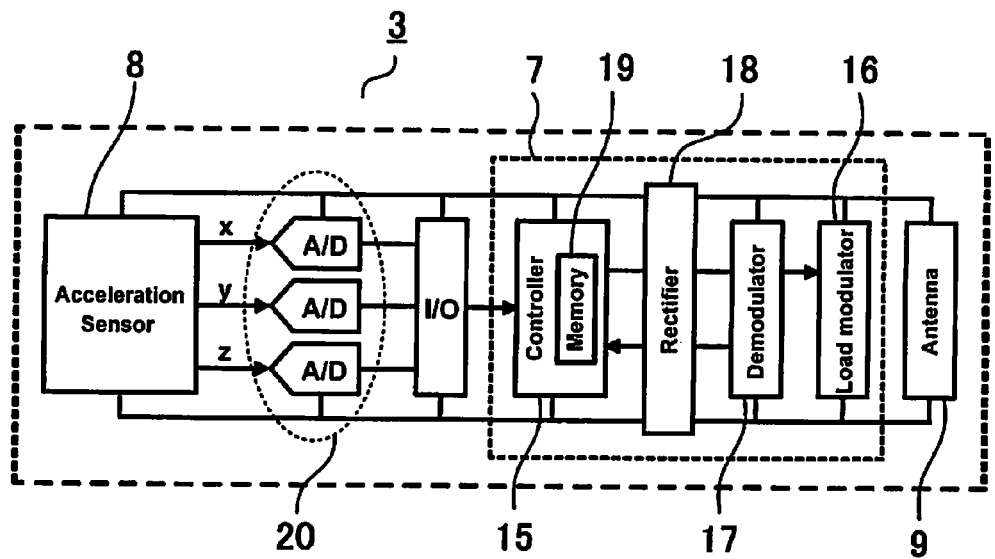
FIG. 5 is a structural block diagram illustrating in detail a radio tag.
FIG. 6 is a view illustrating an acceleration direction of an acceleration sensor of the present embodiment and the state of its signal output.

FIG. 5 is a view illustrating further details of the structure of the radio tag 3 as illustrated in FIG. 2. The RFID chip 7 accommodated in radio tag 3 has a controller 15, a load modulator 16, a demodulator 17, and a rectifier 18. The controller 15 has a memory 19 for storing an ID (identification) for identifying a product, a salesclerk or the like and a reference value of an acceleration signal detected by the acceleration sensor 8 and a threshold value for determining a predetermined acceleration.

The antenna 9 is connected to the load modulator 16, the demodulator 17, and the rectifier 18. The load modulator 16 changes load in accordance with transmission data thereby to transmit a high-frequency signal received by the antenna 9 as an ASK (Amplitude-shift keying) signal. The demodulator 17 demodulates a signal transmitted by the inquiry unit 4 and inputs it to the controller 15. The controller 15, the memory 19, the A/D converter 20 and the acceleration sensor 8 are connected to the rectifier 18, which rectifies a high-frequency signal received by the antenna 9 and supplies the obtained DC to them as a power source.

The acceleration sensor 8 outputs signals corresponding to three directions of x, y and z and supplies them to the A/D converter 20. For example, when the acceleration sensor 8 detects acceleration of −1 G to 1 G, an output of the A/D converter 20 shows −100 to 100. The following description is made, with reference to FIG. 6, about a signal output from the acceleration sensor.

FIG. 6 shows the direction of the acceleration sensor 8 and the state of its signal output. To simplify the description, any of the x, y and z directions is set to be the vertical direction. For example, when the acceleration sensor is in the state 1, the x and y directions are 0 G and for the z axis direction, to detect −1 G, that is, gravitational acceleration, the A/D converter 20 of FIG. 5 shows −100 only for the z signal. In the same way, when the acceleration sensor is in the state 2, the x and z directions are 0 G, and for the y axis direction, to detect 1 G, the A/D converter 20 shows 100 only for the y signal. Further, when the acceleration sensor is in the state 3, the x and y directions are 0 G, and for the z axis direction, to detect 1 G, the A/D converter 20 shows 100 only for the z signal. Furthermore, when the acceleration sensor is in the state 4, the x and z directions are 0 G, and for the y axis direction, to detect −1 G, the A/D converter 20 shows −100 only for the y signal.

The above-mentioned radio tag 3 is of a battery cell less, called a passive type. The radio tag 3 generates power for driving the RFID chip 7 and the acceleration sensor 8 from electric wave of the inquiry unit 4 received by the antenna 9. Here, the radio tag of this embodiment may be of a semi passive type. In this case, the acceleration sensor is driven by the battery. The memory used in this embodiment is preferably a nonvolatile memory.

Figure 7:
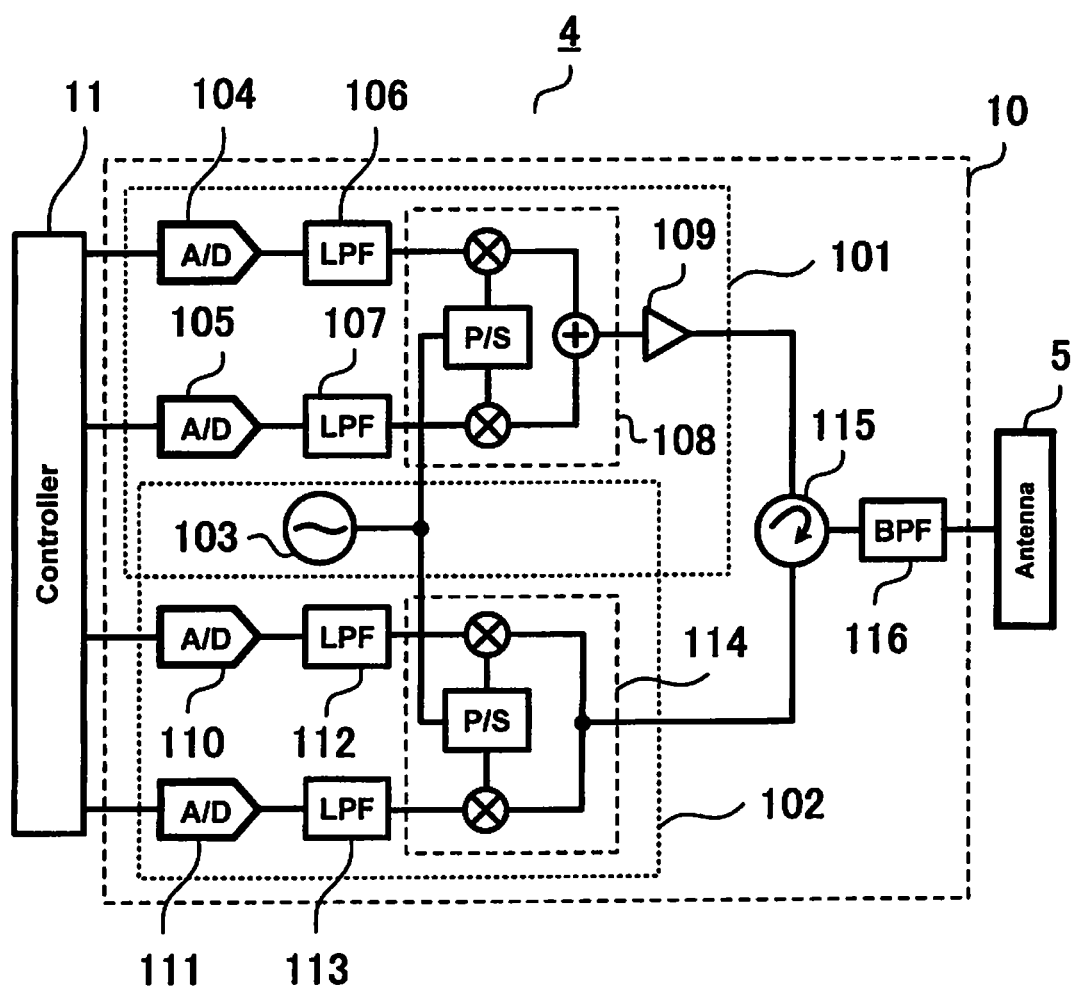
FIG. 7 is a structural block diagram illustrating in detail the inquiry unit.

FIG. 7 is a view illustrating in detail the structure of the inquiry unit 4 shown in FIG. 3. The inquiry unit 4 has the transmission/reception portion 10, the controller 11 and the antenna 5. The transmission/reception portion 10 has a transmission portion 101 and a reception portion 102.

The controller 11 includes an MPU (micro processor) and a memory (both are not shown) and operates in accordance with a pre-stored program.

In the transmission/reception portion 10, a circulator 115 is provided for sharing of the antenna 5 between the transmission portion 101 and the reception portion 102. That is, the antenna 5 is connected to the transmission 101 and the reception portion 102 via a BPF (band pass filter) 116 and the circulator 115.

The transmission portion 101 is configured to have an oscillator 103, first and second A/D converters 104 and 105, first and second LPFs (low pass filters) 106 and 107, a quadrature modulator 108, and a power amplifier 109. In addition, the reception portion 102 is configured to have an oscillator 103, third and fourth A/D converters 110 and 111, third and fourth LPFs 112 and 113, and a quadrature demodulator 114.

In transmission, the controller 11 generates digital data of the I signal and Q signal, converts the I/Q signal to an analogue signal by the first and second A/D converters 104 and 105 and the first and second LPFs 106 and 107, and in the orthogonal modulator 108, modulates it with a local signal generated by the oscillator 103 to generate a modulated signal. After that, the power amplifier 109 is used to amplify the power of the signal and the signal is transmitted from the antenna 5 via the circulator 115 and the BPF 116.

That is, when the controller 11 uses the above-mentioned generated I signal and Q signal to be able to generate constant amplitude modulated wave, ASK modulated wave and continuous wave, switchingly.

On the other hand, in reception, a back scatter signal from the radio tag 3 is input, via the BPF 116 and the circulator 115, into the quadrature demodulator 114 of the reception portion 102. The quadrature demodulator 114 demodulates the local signal generated by the oscillator 103 and the back scatter signal to generate an I signal and a Q signal. These I signal and Q signal are input, via the third and fourth LPFs 112 and 113 and the third and fourth A/D converters 110, 111, into the controller 11 and response information of the radio tag 3 is demodulated.

The communication method of the radio tag 3 and the inquiry unit 4 are, as illustrated in FIG. 10, that the inquiry unit 4 transmits an inquiry signal to the radio tag while it transmits continuous wave (CW). The radio tag 3, for example, radio tag 3a, responds its own ID during CW subsequent to inquiry signal.

Figure 8:
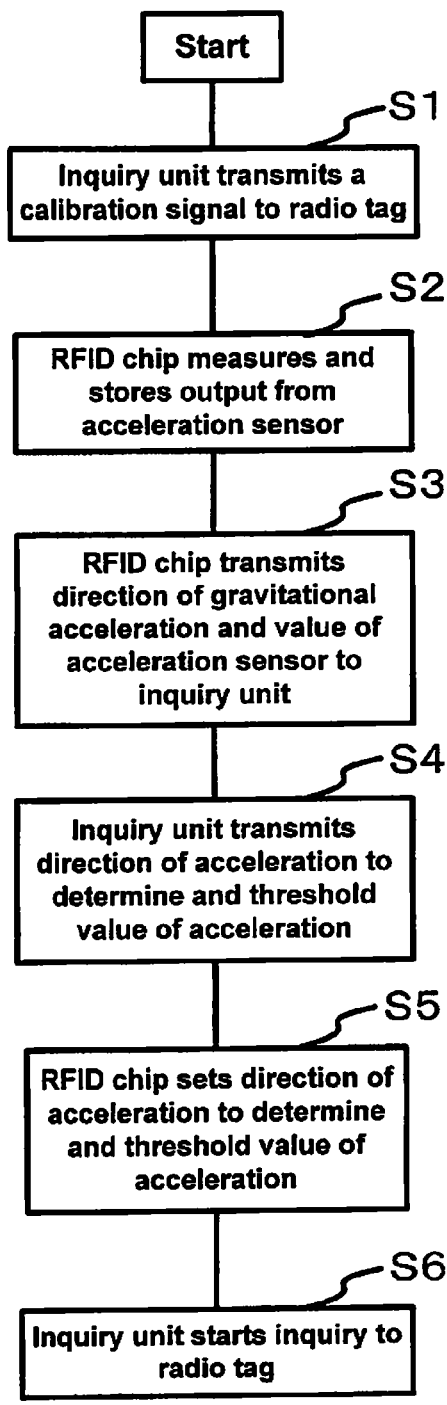
FIG. 8 is a flowchart of operation setting of the product administration system.
Figure 9:
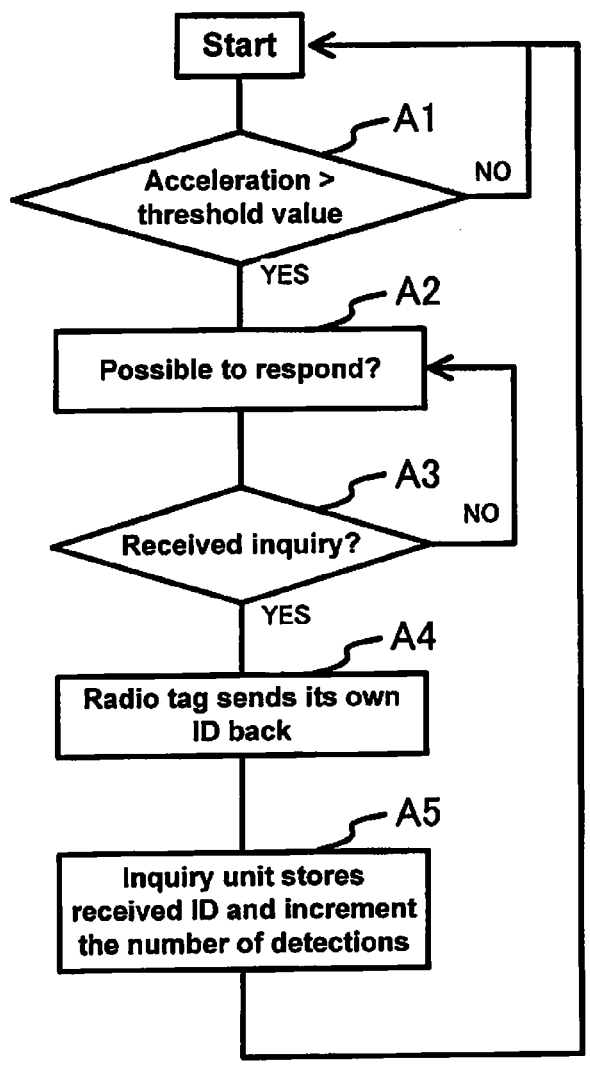
FIG. 9 is a flowchart of the operation of the product administration system.

Description is made, with reference to FIGS. 8 and 9, about the operation of the product administration system of the present embodiment.

As illustrated in FIG. 8, first, the inquiry unit 4 transmits a signal for calibration of the acceleration sensor 8 to the radio tag 3 (S1). Next, the RFID chip 7 built in the radio tag 3 receives signal stores the direction of the gravitational acceleration detected by the acceleration sensor 8 and uses it as a reference value (S2). For example, as illustrated in the state 1 of FIG. 6, if the radio tag 3 is placed horizontally, the x and y axis directions of the acceleration sensor show 0, however, the signal of z axis direction shows −1 G (A/D value=−100). Accordingly, as the gravitational acceleration is found to be −z axis direction, this is stored in the memory, this value and the direction of the gravitational acceleration are sent to the inquiry unit, and the calibration is finished (S3).

After calibration, the inquiry unit 4 transmits the radio tag 3 a signal for setting the direction of acceleration and threshold value for determining the product 2, for example, product 2a is moved from the acceleration detected by the acceleration sensor 8 (S4). That is, the inquiry unit 4 uses the direction of gravitational acceleration detected by the radio tag 3 as a reference to set, for example, the direction of acceleration to be determined as the y axis direction, set the above-mentioned threshold value as 0.5 G (A/D value=50) and sends this to the radio tag 3.

The RFID chip 7 of the radio rag 3 that has received this signal stores (sets), in the memory, a direction of acceleration and a threshold for determining the product 2a has moved (S5). For example, in the horizontal shelf as shown in FIG. 1, the inquiry unit 4 sets acceleration in the horizontal direction, for example, the y axis direction, as a threshold value. Further, in the hanger rack shown in FIG. 4, the inquiry unit 4 sets acceleration in the vertical direction, for example, the z axis direction as a threshold value. After this processing is finished, the inquiry unit 4 starts an inquiry to the radio tag 3 (S6). These settings are performed generally before the store opens.

After the above-mentioned setting is finished, the operational processing is performed following the flowchart shown in FIG. 9.

In FIG. 1, the radio tag 3 is set in advance to detect the horizontal acceleration (y axis direction). For example, when a customer picks up the product 2a from the product shelf 1, there occurs the operation of pulling. Then, if the acceleration exceeds a preset threshold of acceleration (A1), the radio tag 3a starts to prepare to respond to an inquiry from the inquiry unit 4 (A2). When the radio tag 3a receives an inquiry signal from the inquiry unit 4 (A3), the radio tag 3a sends back its own ID (A4). The signal sent from the radio tag 3a is received by the antenna 5 of the inquiry unit 4, demodulated by the transmission/reception portion 10 and stored in the memory of the controller 11 (A5). That is, the inquiry unit 4 gets to know that the radio tag 3a detects acceleration more than the threshold value by receiving the ID signal of the radio tag 3a.

The same operation is repeated to count detections of each ID of the radio tag 3. This makes it possible to know the number of times of picking up by the customer of the product 2 related to the each ID of the radio tag 3.

In addition, in FIG. 4, setting is made such that the acceleration in the z axis direction is detected in advance. For example, the customer picks the product 2a up from the hanger rack 12, there occurs the operation of drawing upward (in the z axis direction). Then, if the acceleration exceeds preset threshold value (A1), it starts to prepare to respond to an inquiry of the inquiry unit 4 (A2). When the radio tag 3a receives an inquiry signal from the inquiry unit 4 (A3), the radio tag 3a sends its own ID (A4). The signal the radio tag sends back is received by the antenna 5 of the inquiry unit 4, demodulated by the transmission/reception portion 10 and stored in the memory of the controller 11 (A5). The like operation is repeated to count detections of each ID by the radio tag 3. Therefore, it becomes possible to know the number of times of picking up by the customer of the product 2 related to its ID of the radio tag 3.

The radio tag 3 used in the product administration system in the above-described embodiment is a general passive tag and is configured to respond to an inquiry from the inquiry unit 4 as described above. For the such radio tag, as the inquiry unit 4 executes the procedure of reading to prevent collision called anti-collision, if a plurality of radio tags exists in a reading area of the inquiry unit 4, it sometimes takes much time in reading.

Then, if the communication method between the inquiry device 4 and the radio tag 3 is changed into a method as described below, the reading time can be shortened.

FIG. 11 is a simplified view of a communication method of the inquiry unit 4 and the radio tag 3 of the product administration system in this embodiment. The inquiry unit 4 transmits to sent continuous wave (CW) and for example, the acceleration sensor 8 of the radio tag 3a exceeds the threshold value, it sends its own ID voluntarily. Likewise, the radio tags 3b and 3c send their own ID voluntarily when the acceleration sensor 8 exceeds the threshold value.

Then, usually, the salesclerk sometimes moves the product picked up by the customer to arrange it. In this case, the product the salesclerk has moved is also counted and it is difficult to know the product moved by the customer. Here, as illustrated in FIGS. 1 and 4, the salesclerk 30 has the ID card 31 having the radio tag with him/her. For example, in FIG. 1, the salesclerk 30 enters the communicable area of the inquiry unit 4 by standing in front of the product shelf 1 to arrange the product, and the ID of the ID card held by the salesclerk 30 is detected by the inquiry unit 4 that always performs inquiring. While the controller 11 of the inquiry unit 4 detects the ID of the salesclerk, the inquiry unit 4 stops inquiring or it discards a response signal from the radio tag 3 or stops the product monitoring processing. This makes it possible to distinguish the product moved by the salesclerk from the product moved by the customer.

As described above, according to the product administration system of the present embodiment, even if a customer picks up a target product from a product shelf, hanger rack or the like and a product other than the target product is moved, such a product other than the target product is prevented from being detected, and thereby marketing per product can be performed accurately. In addition, as a product moved by a salesclerk and a product moved by a customer are distinguished clearly, marketing per product can be performed accurately.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions the accompanying claims and their equivalents are intended to cover such forms or modifications as would fall within the scope and spirit of the inventions.

What is claimed is:

1. A product administration system comprising
a first radio tag having an acceleration sensor and being attached to a product;
a second radio tag that a salesclerk has with him/her; and
an inquiry unit communicating with the first radio tag and the second radio tag,
wherein
the inquiry unit sets a direction of acceleration and a threshold value of the acceleration in the direction, in the first radio tag by communication,
the first radio tag responds to an inquiry from the inquiry unit when the acceleration detected by the acceleration sensor exceeds the threshold value, and
if the inquiry unit detects an ID of the second radio tag, the inquiry unit stops the inquiry.

2. The product administration system of claim 1, wherein the radio tag is of a passive type.

3. The product administration system of claim 1, wherein the radio tag is of a semi passive type.

4. A product administration system comprising:
a first radio tag having an acceleration sensor and being attached to a product;
a second radio tag that a salesclerk has with him/her; and
an inquiry unit communicating with the first radio tag and the second radio tag,
wherein
the inquiry unit sets a direction of acceleration and a threshold value of the acceleration in the direction, in the first radio tag by communication,
the first radio tag responds to an inquiry from the inquiry unit when the acceleration detected by the acceleration sensor exceeds the threshold value, and
while the inquiry unit detects an ID of the second radio tag, the inquiry unit stops inquiring.

5. The product administration system of claim 4, wherein the radio tag is of a passive type.

6. The product administration system of claim 4, wherein the radio tag is of a semi passive type.

7. A product administration system comprising:
a first radio tag having an acceleration sensor and being attached to a product;
a second radio tag that a salesclerk has with him/her; and
an inquiry unit communicating with the first radio tag and the second radio tag,
wherein
the inquiry unit sets a direction of acceleration and a threshold value of the acceleration in the direction, in the first radio tag by communication,
the first radio tag responds to an inquiry from the inquiry unit when the acceleration detected by the acceleration sensor exceeds the threshold value, and
while the inquiry unit detects an ID of the second radio tag, an ID of the first radio tag is discarded.

8. The product administration system of claim 7, wherein the radio tag is of a passive type.

9. The product administration system of claim 7, wherein the radio tag is of a semi passive type.

* * * * *